United States Patent [19]

Potter et al.

[11] 4,059,539

[45] Nov. 22, 1977

[54] (U,ZR)N ALLOY HAVING ENHANCED THERMAL STABILITY

[75] Inventors: Ralph A. Potter, Lynchburg, Va.; James L. Scott, Knoxville, Tenn.

[73] Assignee: The United States of America as represented by the United States Energy Research and Development Administration, Washington, D.C.

[21] Appl. No.: 647,477

[22] Filed: Jan. 8, 1976

Related U.S. Application Data

[63] Continuation of Ser. No. 490,447, July 22, 1974, abandoned.

[51] Int. Cl.² ............................................. G21C 3/58
[52] U.S. Cl. ............................. 252/301.1 R; 176/88; 423/251; 423/252; 423/253
[58] Field of Search ............... 423/253, 254, 250, 251, 423/252; 75/122.7; 252/301.1 R; 176/88

[56] References Cited

U.S. PATENT DOCUMENTS 3,758,669  9/1973  Potter ................................. 423/254
3,766,082  10/1973  Tennery et al. ..................... 423/254

OTHER PUBLICATIONS

Holleck et al., Monatsh Chemie vol. 99, p. 985–989 (1968).
Schwarzkopf et al., *Refractory Hard Metals,* MacMillan, N.Y., 1953, pp. 236–237, 255–257.

*Primary Examiner*—Richard E. Schafer
*Attorney, Agent, or Firm*—Dean E. Carlson; Stephen D. Hamel; Irving Barrack

[57] ABSTRACT

A nitrided alloy of uranium and zirconium is provided which consists of a single-phase UN structure containing a dissolved amount of Zr as ZrN, effective to inhibit dissociation of the UN phase.

2 Claims, No Drawings

(U,ZR)N ALLOY HAVING ENHANCED THERMAL STABILITY

BACKGROUND OF THE INVENTION

The invention described herein was made in the course of, or under, a contract with the U.S. Atomic Energy Commission.

This is a continuation of application Ser. No. 490,447, filed July 22, 1974, now abandoned.

The present invention relates to an improved form of UN. More particularly, it is concerned with a single-phase uranium-zirconium mononitride composition which is characterized by an enhanced thermal stability at temperatures of 1600° C. and above in comparison to uranium mononitride.

Uranium mononitride (UN) is an attractive nuclear fuel because of its high uranium density (14.32), high melting point (2850° C. at 2.5 atmospheres), and usefully high thermal conductivity (0.06 at 1000° C.). Because of its high uranium content, UN can, for example, be substituted for $UO_2$ and occupy approximately 30 percent less volume at an equivalent uranium content. This combination of properties makes UN an excellent candidate fuel for use in high-temperature (fuel temperatures greater than 1500° up to 1700° C.) fast reactors, especially those designed to operate in outer space. A limiting factor which mitigates against its use in such and similar context is its dissociation into liquid uranium and nitrogen gas under reduced pressures at these higher temperatures. It is accordingly a principal object of this invention to provide a modified uranium mononitride composition which does not dissociate at a temperature in the range 1500°-1700° C.

In order to derive maximum benefit from UN it is generally held desirable to make it available for use as a homogeneous single-phase structure as opposed to a multiphase structure in which disruptive phase changes may occur during use or where homogeneity is difficult to obtain. It is therefore an additional object of this invention to provide a homogeneous single-phase uranium mononitride composition having improved thermal stability. A further object is to provide a modified sintered UN compact having a lowered dissociation constant or rate of decomposition at 1600° C. to 1700° C. in comparison to pure UN.

SUMMARY OF THE INVENTION

The objects of this invention are obtained by nitriding a mixture of uranium and a minor amount not exceeding 10 percent by weight zirconium to produce a (U,Zr)N alloy product having enhanced thermal stability. The resultant nitrided product consists of a solution of zirconium mononitride within a solvent matrix of uranium mononitride. This product appears to be no different from pure UN and metallographic studies of the (U,Zr)N product show it to be a single-phase material. The X-ray diffraction pattern of a (U,Zr)N product is that of a body-centered cubic structure with an X-ray lattice parameter of 4.86 for a (U,Zr)N product containing 3.4 percent Zr by weight as opposed to 4.89 for pure UN.

In addition to enhancing the high-temperature stability of UN at temperatures in excess of 1500° C., the presence of ZrN appears to function as a stabilizing factor during the fabrication of a (U,Zr)N sintered compact to prevent formation of higher nitrides of uranium.

The amount of Zr which is effective to stabilize the UN in these respects may vary from as little as 2 to as much as 10 weight percent, 3-5 being preferred. Lower amounts of Zr do not produce sufficient amounts of ZrN to impart a stabilizing effect to the resultant (U,Zr)N product. Greater amounts of Zr dilute the uranium excessively for nuclear fuel applications.

The improved (U,Zr)N fuel of this invention may be conveniently prepared from a U-Zr alloy to convert the alloy to a (U,Zr)N product in accordance with the hydride-dehydride-nitride process as disclosed in U.S. Pat. No. 3,758,669. Beginning with a U-Zr alloy of the desired composition, the alloy is hydrided by a series of hydride-dehydride reactions to fragment and convert the alloy into a fine hydride powder. The hydrided alloy is then subjected to a series of dehydride-nitride cycles in which the alloy is heated to dehydride a portion of the alloy hydride and then cooled in a nitrogen atmosphere at a temperature lower than the dehydriding temperature to nitride the dehydrided portion. Succeeding dehydride-nitride cycles are conducted at dehydriding temperatures higher than the dehydriding temperature of the previous cycle until the entire charge has been converted to a (U,Zr)N powder, appearing virtually indistinguishable from pure UN. The (U,Zr)N is transferred to an inert atmosphere glove box and thence fabricated by binderless isostatic pressing at $6 \times 10^4$ psi into rods. The rods are then transferred to a furnace and exposed to a sintering schedule involving treatment at 1500° C. and then at a temperature in the range 2200° to 2300° C. in nitrogen at 760 torr for a period of 2 to 4 hours. A characterization of an as-sintered (U,Zr)N specimen prepared according to this procedure is given in the table, which lists a UN specimen prepared according to the same schedule for purposes of comparison.

TABLE

|  | UN | (U,Zr)N |
|---|---|---|
| Chemical Analysis |  |  |
| U, wt % | 94.50 | 90.51 |
| N, wt % | 5.45 | 5.51 |
| O, ppm | 320 | 204 |
| C, ppm | 400 | 361 |
| Zr, wt % |  | 3.40 |
| Zr, mole % |  | 8.93 |
| X-ray Lattice Parameter | 4.889 | 4.856 |
| Density, g/cm$^3$ | 13.38 | 13.16 |

As-sintered UN and (U,Zr)N specimens prepared as described were placed on tungsten plates in a cold-wall vacuum furnace. The specimens were heated at 1600° C. under a vacuum of $1 \times 10^{-5}$ torr for a total of 8 hours, with intermediate weighings after 1 and 4 hours. The test temperature was then raised to 1700° C. at the same pressure for an additional 8 hours with similar intermediate weighings. The results of these tests showed that at 1600° C. the rate of weight loss of the (U,Zr)N sample was about half that of UN, and at 1700° C. the (U,Zr)N was about three-fourths that of UN. The pure UN sample dissociated to the extent that it sintered to the tungsten filter plate after only 1 hour at 1600° C.

An examination of the microstructure of the UN sample showed the presence of free uranium metal. After the additional 8-hour treatment at 1700° C., the UN sample contained extensive free metal distributed throughout its volume while the (U,Zr)N sample showed only slight traces limited to the surface of the sample.

Extended thermal testing of the samples was conducted at 1600° C. under a pressure of $2 \times 10^{-6}$ torr for a period of 100 hours. Both UN and the (U,Zr)N samples decreased in dimension, weight, and bulk density (about 2%). The weight loss of the (U,Zr)N sample was about one-third of the pure UN, indicating a significant increase in thermal stability.

In the foregoing specification and in the claims, the novel and improved composition is designated $(U_xZr_y)N$ and is meant to be understood as involving a composition of 50% nitrogen and 50% metal atoms where $x$ and $y$ indicate the relative concentration of metal. Oxygen and carbon concentrations should be limited to levels which avoid second phase formation. This is particularly true of oxygen where concentrations greater than 0.1% (1000 ppm) may create $UO_2$ or oxynitride-containing phases. Generally speaking, oxygen-containing phases result in reduction of thermal conductivity, swelling in service, adverse reaction with alkali metal coolants, as well as enhanced plasticity and volatility of relatively volatile UO forms. Soluble carbon concentrations up to 1000 ppm (0.1% C) can be tolerated to a greater extent since none of these potential drawbacks exist with carbon.

The scope of and advantages of the claimed composition should be also understood to include Pu as part of the metal component and UN phase in fuel compositions designed for use as fuel in fast breeder reactors designated as (U,Pu,Zr)N. For breeder reactors operating on the U-233 breeding cycle, the (U,Zr)N compositions can accommodate thorium as part of the metal component as (U,Th,Zr)N compositions to realize the enhanced thermal stability provided by the zirconium contribution.

What is claimed is:

1. In a method of operating a nuclear reactor at a temperature at which UN fuel decomposes to free uranium, the improvement which comprises using a (U,Zr)N composition containing at least 2 and up to 10 weight percent Zr at a temperature in the range 1500°–1700° C. as a reactor fuel in said reactor said (U,Zr)N being a solid solution of ZrN in a solvent matrix of UN and having a homogeneous single-phase structure.

2. The method according to claim 1 in which the (U,Zr)N composition contains Th or Pu.

* * * * *